(12) United States Patent
Hainke et al.

(10) Patent No.: US 8,718,985 B2
(45) Date of Patent: May 6, 2014

(54) METHOD FOR ESTABLISHING MACHINE CODE, THE EXECUTION OF WHICH GENERATES AN OPTIMIZED ROLLING MODEL

(75) Inventors: Marc Hainke, Lauf a.d. Pegnitz (DE); Matthias Kurz, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 716 days.

(21) Appl. No.: 12/999,773

(22) PCT Filed: May 22, 2009

(86) PCT No.: PCT/EP2009/056236
§ 371 (c)(1),
(2), (4) Date: Dec. 17, 2010

(87) PCT Pub. No.: WO2009/156234
PCT Pub. Date: Dec. 30, 2009

(65) Prior Publication Data
US 2011/0106512 A1 May 5, 2011

(30) Foreign Application Priority Data
Jun. 25, 2008 (DE) .......................... 10 2008 030 243

(51) Int. Cl.
*G06F 17/10* (2006.01)
(52) U.S. Cl.
USPC ............................................................ 703/2
(58) Field of Classification Search
USPC .................................................. 703/1, 2, 25
See application file for complete search history.

(56) References Cited

U.S. PATENT DOCUMENTS

| | | | |
|---|---|---|---|
| 2003/0102401 A1* | 6/2003 | Muller et al. | ............... 242/534.1 |
| 2009/0235707 A1* | 9/2009 | Schmidt | ........................ 72/11.1 |
| 2009/0265146 A1 | 10/2009 | Franz et al. | ........................ 703/2 |
| 2011/0106512 A1 | 5/2011 | Hainke et al. | ..................... 703/2 |

FOREIGN PATENT DOCUMENTS

| | | | |
|---|---|---|---|
| CN | 1640572 A | 7/2005 | ............... B21B 1/28 |
| DE | 19641432 A1 | 4/1998 | ............. B21B 37/00 |
| DE | 10049260 A1 | 4/2002 | ............. B21B 37/28 |
| DE | 102005036068 A1 | 2/2007 | ............. B22D 46/00 |
| WO | 2007/014831 | 2/2007 | ............. G06F 17/50 |
| WO | 2009/156234 A2 | 12/2009 | .......... G05B 13/048 |

OTHER PUBLICATIONS

Chinese Office Action, Application No. 200980124295.0, 43 pages, Oct. 31, 2012.
International PCT Search Report, PCT/EP2009/056236, 14 pages, Mailed Jan. 19, 2010.
German Office Action, German application No. 102008030243.0-55, 6 pages, Feb. 20, 2009.

* cited by examiner

*Primary Examiner* — Kamini S Shah
*Assistant Examiner* — Andre Pierre Louis
(74) *Attorney, Agent, or Firm* — King & Spalding L.L.P.

(57) ABSTRACT

In a method for establishing a machine code which can be immediately executed by a computer, the execution of which causes the computer to implement a rolling model and to determine an output variable that quantitatively describes at least one material flow occurring in the rolling stock during a rolling process defined by the condition of the rolling stock and the roll stand setting. The output variable is determined on the basis of the rolling model, a rolling stock condition lying within a predetermined range of conditions, and a roll stand setting lying within a predetermined range of settings. Furthermore, a computer program, a data carrier, a computer, and a rolling train with at least one roll stand are disclosed.

13 Claims, 5 Drawing Sheets

METHOD FOR ESTABLISHING MACHINE CODE, THE EXECUTION OF WHICH GENERATES AN OPTIMIZED ROLLING MODEL

CROSS-REFERENCE TO RELATED APPLICATIONS

This application is a U.S. National Stage Application of International Application No. PCT/EP2009/056236 filed May 22, 2009, which designates the United States of America, and claims priority to DE Application No. 10 2008 030 243.0 filed Jun. 25, 2008. The contents of which are hereby incorporated by reference in their entirety.

TECHNICAL FIELD

The present invention relates to a method for establishing machine code which can be executed directly by a computer and the execution of which by the computer causes the computer to implement a rolling model and to determine an output variable which quantitatively describes at least one material flow occurring in the rolling stock during a rolling process defined by the condition of the rolling stock and the stand setting, said output variable being determined on the basis of the rolling model, a condition of rolling stock lying within a predetermined range of conditions and a stand setting lying within a predetermined range of settings.

The present invention also relates to a computer program having machine code which can be executed directly by a computer and the execution of which by the computer causes the computer to implement such a rolling model and to determine the output variable on the basis of the rolling model, the condition of the rolling stock and the stand setting.

The present invention also relates to a data storage medium which stores such a computer program in machine-readable form.

The present invention also relates to a computer which is programmed using such a computer program, such that the computer executes the computer program during operation.

Finally, the present invention relates to a rolling mill train having at least one rolling stand and a computer in the form of a control device for a rolling mill train, the computer executing the computer program online in conjunction with the control of the rolling mill train, and the at least one rolling stand being controlled by the computer.

BACKGROUND

Such subject matters are generally known.

In order to technologically predict rolling processes, it is necessary to simulate the rolling processes using an appropriately accurate model. Such models are known per se. Highly accurate models, for example, are used to design plate rolling mill trains and other strip rolling mill trains and merchant bar trains. These models usually operate with formulation functions which are based on the finite element method. Such models can be used, in particular, to effectively model the material flow of the rolling stock in the roll gap. In the case of strip-shaped rolling stock, this applies both to pure flat passes, in which the thickness of the strip-shaped rolling stock is reduced, and to a sequence of edging and flat passes, the broadside rolling of the strip-shaped rolling stock being counteracted in the edging passes. In the case of a sequence of edging and flat passes, both the so-called dog-boning which occurs during edging passes and the so-called bulging and constriction which occur during flat passes can be modeled and quantitatively predicted, in particular. The profile and flatness of the strip-shaped rolling stock can also be predicted with a good degree of accuracy in the case of a sequence of flat passes.

Finite element methods operate with a high resolution. With computer powers which are possible nowadays, several hours are needed for the prediction. These models are not suitable for online calculations which may last only a few seconds. Empirical models are therefore used during online calculations. However, in the case of strip-shaped rolling stock for example, the empirical models are unsuitable for providing accurate statements relating to the strip form, the strip profile and the strip flatness.

SUMMARY

According to various embodiments, it can be made possible to quantitatively model the material flow occurring in a rolling process in a simpler manner than in the prior art.

According to an embodiment, in a method for establishing machine code which can be executed directly by a computer and the execution of which by the computer causes the computer to implement a rolling model based on mathematical/physical equations and to determine an output variable which quantitatively describes at least one material flow occurring in the rolling stock during a rolling process defined by the condition of the rolling stock and the stand setting, said output variable being determined on the basis of the rolling model, a condition of the rolling stock lying within a predetermined range of conditions and a stand setting lying within a predetermined range of settings, a number of basic conditions of the rolling stock lying within the range of conditions and a number of basic stand settings lying within the range of settings being predefined for a basic model which is based on the mathematical/physical equations and uses universal formulation functions, and an output condition respectively being determined using the basic model,
  each output condition being described by a number of weighting factors which each specify the extent to which a respective corresponding formulation function of the universal formulation functions occurs in the rolling stock following the rolling process defined by the respective basic condition of the rolling stock and the respective basic stand setting,
  adapted formulation functions being determined by analyzing all of the output conditions determined,
  the number of adapted formulation functions being considerably smaller than the number of universal formulation functions,
  the rolling model being established using the adapted formulation functions, and
  the machine code being established on the basis of the rolling model.

According to a further embodiment, the analysis of all of the output conditions determined can be a singular value decomposition. According to a further embodiment, a quadratic, symmetrical matrix can be determined on the basis of all of the output conditions determined, and the adapted formulation functions may correspond to some of the eigenvectors of the quadratic, symmetrical matrix. According to a further embodiment, the eigenvalues of the quadratic, symmetrical matrix can be determined, and the adapted formulation functions may correspond to the eigenvectors associated with the largest eigenvalues. According to a further embodiment, the rolling model may have an advance block and a main block, the condition can be transformed into components of the adapted formulation functions in the advance block, and the output variable can be determined in the main block on the basis of the components of the adapted formulation functions and the stand settings. According to a further embodiment, the output variable may comprise a number of weighting factors which each specify the extent to which a respective corresponding formulation function of the adapted formulation functions occurs in the rolling stock following the rolling process defined by the condition of the rolling stock and the stand setting. According to a further embodiment, the basic model can be established during the establishing method. According to a further embodiment, the rolling stock can be strip-shaped rolling stock. According to a further embodiment, the rolling model quantitatively may describe the material flow occurring when calibration rolls of an edger are used.

According to another embodiment, a computer program may have machine code obtained by an establishing method as described above.

According to yet another embodiment, a data storage medium may store a computer program as described above in machine-readable form.

According to yet another embodiment, a computer may be programmed using a computer program as described above, such that the computer executes the computer program during operation.

According to a further embodiment of the computer, the computer can be in the form of a control device for a rolling mill train and executes the computer program online in conjunction with the control of the rolling mill train.

According to yet another embodiment, a rolling mill train may have at least one rolling stand and a computer as described above, wherein the at least one rolling stand being controlled by the computer.

BRIEF DESCRIPTION OF THE DRAWINGS

Further advantages and details emerge from the following description of exemplary embodiments in conjunction with the drawings, in which, in a basic illustration:

FIG. 7,
FIGS. 9 and 10 show flowcharts.

DETAILED DESCRIPTION

According to various embodiments, a number of basic conditions of the rolling stock lying within the desired range of conditions and a number of basic stand settings lying within the range of settings are predefined for a basic model which is based on mathematical/physical equations and uses universal formulation functions. An output condition is respectively determined using the basic model. Each output condition is described by a number of weighting factors which each specify the extent to which a respective corresponding formulation function of the universal formulation functions occurs in the rolling stock following the rolling process defined by the respective basic condition of the rolling stock and the respective basic stand setting. Adapted formulation functions are determined by analyzing all of the output conditions determined. The number of adapted formulation functions is considerably smaller than the number of universal formulation functions. The rolling model is established using the adapted formulation functions, the rolling model being based on the mathematical/physical equations. The machine code is established on the basis of the rolling model.

According to various embodiments, in the case of models which are based on the universal formulation functions (for example the finite elements already mentioned), an amount of computational complexity which is not matched to the problem is required. This computational complexity can be drastically reduced by using the "correct" formulation functions (that is to say the adapted formulation functions). The method according to an embodiment provide these formulation functions. The model is then established, on the basis of the adapted formulation functions determined, in a manner known per se.

It is possible to "intellectually" analyze all of the output conditions determined and to "intellectually" decide how the adapted formulation functions should be configured. This procedure generally provides usable but suboptimal results. It is therefore better that the analysis of all of the output conditions determined is a singular value decomposition. The term "singular value decomposition" has a fixed meaning for experts.

Although the singular value decomposition is possible, it is preferred if a quadratic matrix is determined on the basis of all of the output conditions determined, and the adapted formulation functions correspond to some of the eigenvectors of the quadratic matrix. In order to determine the quadratic matrix, the weighting factors of each output condition may be written as a column vector, for example, and the individual column vectors may be written beside one another. This results in a coefficient matrix. The coefficient matrix is multiplied by its transpose. The matrix product produces a quadratic, symmetrical matrix whose eigenvectors can then be determined.

It is possible to determine only the eigenvectors and to then "intellectually" select those eigenvectors which are intended to correspond to the adapted formulation functions. However, one embodiment provides for the eigenvalues of the quadratic, symmetrical matrix to be determined. In this case, the adapted formulation functions correspond to the eigenvectors associated with the largest eigenvalues.

For example, the eigenvalues can be sorted according to size (the largest first, the smallest last). In this case, the first n eigenvalues, for example, can be singled out, for example 5, 10 or 15 eigenvalues. The first x percent of the eigenvalues can also be singled out. All eigenvalues which are larger than a threshold value can also be singled out. The threshold value may alternatively be stated as an absolute value or as a fraction of the largest eigenvalue.

It is possible to establish the rolling model in such a manner that the condition is predefined to the rolling model already on the basis of the adapted formulation functions. Alternatively, it is possible for the rolling model to have an advance block and a main block, for the condition to be transformed into components of the adapted formulation functions in the advance block, and for the output variable to be determined in the main block on the basis of the components of the adapted formulation functions and the stand settings. It goes without saying that the rolling model is accordingly determined during the establishing method in this case.

The output variable preferably comprises a number of weighting factors which each specify the extent to which a respective corresponding formulation function of the adapted formulation functions occurs in the rolling stock following the rolling process defined by the condition of the rolling stock and the stand setting.

The basic model may be given. It may alternatively be established during the establishing method.

In principle, the rolling stock may be of any desired nature. It may be strip-shaped rolling stock, for example. In this case, the rolling model, in particular, may quantitatively describe the material flow occurring when calibration rolls of an edger are used.

Other embodiments also relate to a computer program having machine code obtained by an establishing method of the type described last.

Yet other embodiments also relate to a data storage medium which stores such a computer program in machine-readable form.

Yet other embodiments also relate to a computer which is programmed using such a computer program, such that the computer executes the computer program during operation.

It is possible for the computer to operate offline, that is to say in a manner detached from the control of a rolling mill train. However, the rolling model requires only very little computational complexity on account of the use of the adapted formulation functions. It is therefore fast enough for the computer to be in the form of a control device for a rolling mill train and to execute the computer program online in conjunction with the control of the rolling mill train. In this case, other embodiments also relate to a rolling mill train having at least one rolling stand and such a computer, the at least one rolling stand being controlled by the computer.

Figure 1:
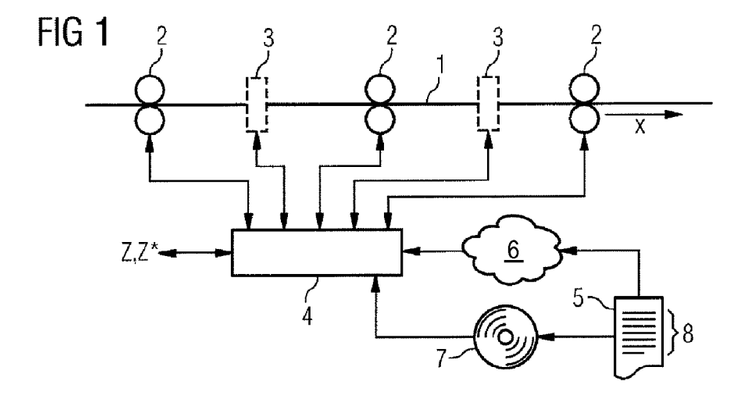
FIG. 1 diagrammatically shows a rolling mill train.

According to FIG. 1, a rolling mill train for rolling rolling stock 1 has a number of rolling stands 2, 3. According to FIG. 1, the rolling stock 1 is strip-shaped rolling stock 1 in this case. However, various embodiments can also be used for other types of rolling stock 1, for example for rod-shaped or tubular rolling stock 1.

The strip-shaped rolling stock 1 can be rolled in flat passes using at least some of the rolling stands 2, 3—the rolling stands 2 in this case. The rolling stands 2 which can be used to roll the strip-shaped rolling stock 1 in flat passes must be present. Depending on the design of the rolling mill train, edgers 3—the rolling stands 3 in this case—in which the strip-shaped rolling stock 1 is subjected to edging passes may also be present. The edgers 3 may have calibration rolls for this purpose. The edgers 3 are not present in all rolling mill trains. They are depicted only using dashed lines in FIG. 1 for this reason.

The rolling mill train also has a computer 4 which controls the rolling stands 2, 3 and also the rolling mill train as a whole. According to FIG. 1, the computer 4 is therefore in the form of a control device for the rolling mill train.

The computer 4 is programmed using a computer program 5. The computer program 5 may have been supplied to the computer 4 via a computer-computer link 6 (LAN, World Wide Web, etc.), for example. Alternatively, it is possible for the computer program 5 to be stored on a data storage medium 7 in machine-readable form and to then be supplied to the computer 4 via the data storage medium 7. A CD-ROM is illustrated as the data storage medium 7 in FIG. 1. However, the data storage medium 7 may alternatively have a different design, for example as a USB memory stick or an SD memory card.

The computer program 5 has machine code 8. The machine code 8 can be directly and immediately executed by the computer 4. It is executed by the computer 4 during operation. Operation of the computer 4 is explained briefly below in connection with FIG. 2.

Figure 2:
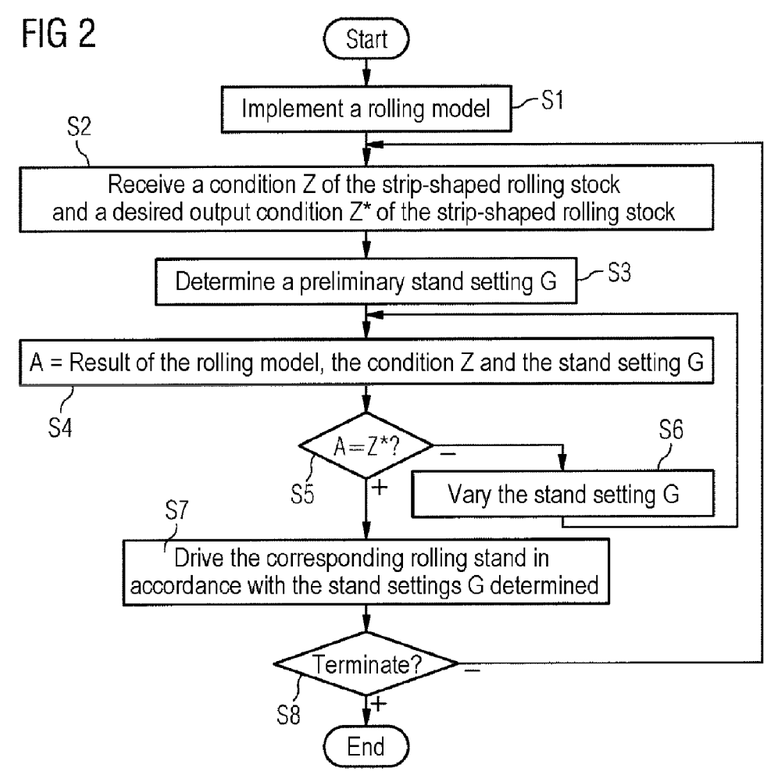
FIG. 2 shows a flowchart.

According to FIG. 2, the computer 4 first of all implements a rolling model 9 (additionally see FIG. 3) in a step S1. In a step S2, the computer 4 receives a condition Z of the strip-shaped rolling stock 1 and a desired output condition Z* of the strip-shaped rolling stock 1. The condition Z relates to the condition of the strip-shaped rolling stock 1 before rolling and the desired output condition Z* relates to the condition of the strip-shaped rolling stock 1 following the rolling process. At least the condition Z lies within a predetermined range of conditions. The desired output condition Z* preferably also lies within the desired range of conditions.

In a step S3, the computer 4 determines a preliminary stand setting G. The stand setting G lies within a predetermined range of settings for a modeled rolling stand 2, 3. The stand setting G may define, for example, whether a flat pass or an edging pass is involved and how the rolling stand 2, 3 which carries out the pass has been set.

In a step S4, the computer 4 determines an output variable A on the basis of the rolling model 9, the condition Z and the stand setting G. The rolling model 9 therefore provides the output variable A on the basis of the condition Z predefined to it and the stand setting G predefined to it. The output variable A generally has a number of weighting factors a which specify the extent to which an adapted formulation function φ associated with the respective weighting factor a occurs in the strip-shaped rolling stock 1 following the rolling process (as defined by the respective condition Z of the strip-shaped rolling stock 1 and the respective stand setting G). The weighting factors a can be determined, for example, with the aid of the Galerkin method which is generally known to experts. Alternatively, the weighting factors a can be determined using a variation formulation, for example. As a matter of form, it is mentioned that an index i is additionally used in FIG. 3 (and also at other points) in order to indicate that a plurality of respectively different adapted formulation functions p, weighting factors a etc. are involved. The output variable A quantitatively describes at least one material flow occurring in the strip-shaped rolling stock 1 during a rolling process defined by the condition Z and the stand setting G. If appropriate, the output variable A may describe other properties. However, at least the abovementioned property is quantitatively described.

In a step S5, the computer 4 checks whether the output variable A determined corresponds to the desired output condition Z* (within permissible tolerances). If this is not the case, the computer 4 moves to a step S6 in which it varies the stand setting G within the range of settings. From step S6, the computer 4 returns to step S4.

If the output variable A determined corresponds to the desired output condition Z* to a sufficient extent, the computer 4 moves to a step S7. In step S7, the computer 4 drives the corresponding rolling stand 2, 3 in accordance with the stand setting G determined last.

Steps S2 to S7 are run through repeatedly on the basis of a step S8 until the method in FIG. 2 is intended to be terminated.

In the case of the procedure described above in connection with FIG. 2, the computer 4 executes the computer program 5 online in conjunction with the control of the rolling mill train. This procedure is preferred. Alternatively, it is possible for the computer 4 not to be in the form of a control device for the rolling mill train and to execute the computer program 5 offline. In this case, step S7 may be replaced, for example, with a step (not illustrated) in which the respectively determined output variable A is stored or is output to a user of the computer 4.

Figure 3:
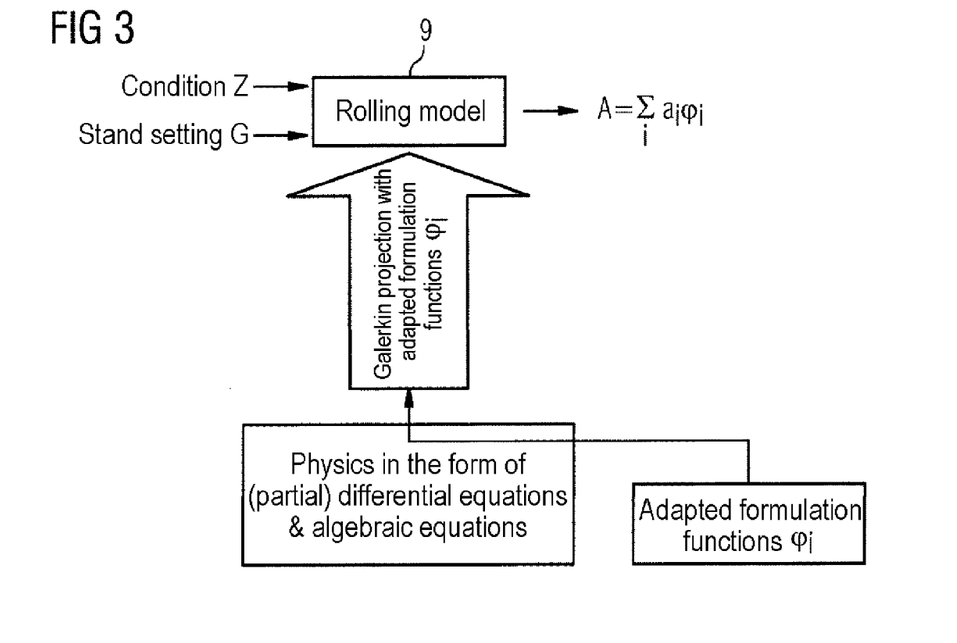
FIG. 3 shows the method of operation of the rolling model.

The rolling model 9 is designed according to FIG. 3 in such a manner that it is based on mathematical/physical equations. According to FIG. 3, the mathematical/physical equations may comprise algebraic equations. Alternatively or additionally, the mathematical/physical equations may comprise (partial) differential equations according to FIG. 3. Furthermore, adapted formulation functions φ, that is to say formulation functions φ which are tailored to the typical passes of the respective rolling stand(s) 2, 3, are used in the rolling model 9 according to FIG. 3.

In the example explained in which the rolling stock 1 is strip-shaped, it is possible for the range of settings for the stand setting G to comprise solely flat passes. Alternatively, it is possible in the example explained for the range of settings to comprise both flat passes and edging passes. In both cases, the material flow comprises at least the transverse flow transverse to the rolling direction x of the strip-shaped rolling stock 1, that is to say in the width direction of the strip-shaped rolling stock 1. The material flow preferably also comprises the longitudinal flow in the rolling direction x.

Figure 4:
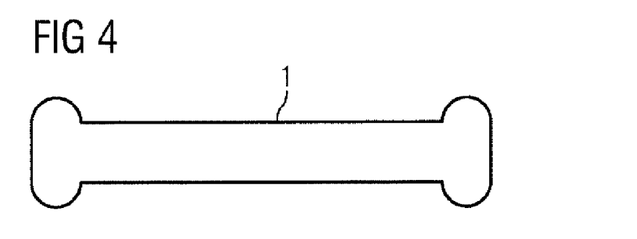
FIGS. 4 to 6 show possible cross sections of strip-shaped rolling stock.
Figure 5:
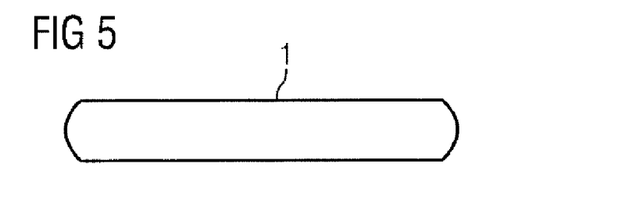
Figure 6:
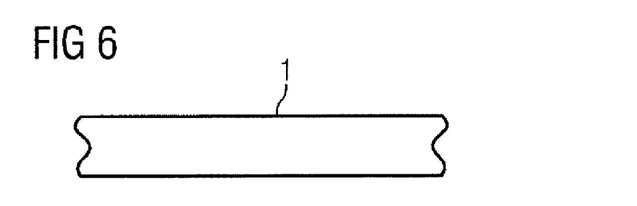

In the case of a pure sequence of flat passes, the profile and/or the flatness of the strip-shaped rolling stock 1 can be determined using the rolling model 9. In the case of a sequence of passes in which flat passes and edging passes alternate, the output variables A of the rolling model 9 quantitatively describe both so-called dog-boning (see FIG. 4) and bulging (see FIG. 5) and constriction (see FIG. 6) of the strip-shaped rolling stock 1. The so-called dog bone can occur in edging passes and bulging and constriction can occur in flat passes.

The manner in which the rolling model 9 is established is arbitrary in principle. The decisive factor is that the rolling model 9 is based on the adapted formulation functions T. For this reason, the model has online capabilities despite the use of the mathematical/physical equations.

A possible method for establishing the rolling model 9 is explained in more detail below in connection with FIGS. 7 and 8.

However, it is pointed out again that this establishing method is purely exemplary. It limits the rolling model 9 only insofar as the rolling model 9 must consequently have the properties explained using FIGS. 7 and 8. However, it is irrelevant whether or not the rolling model 9 is established using the procedure described in FIGS. 7 and 8.

Figure 7:
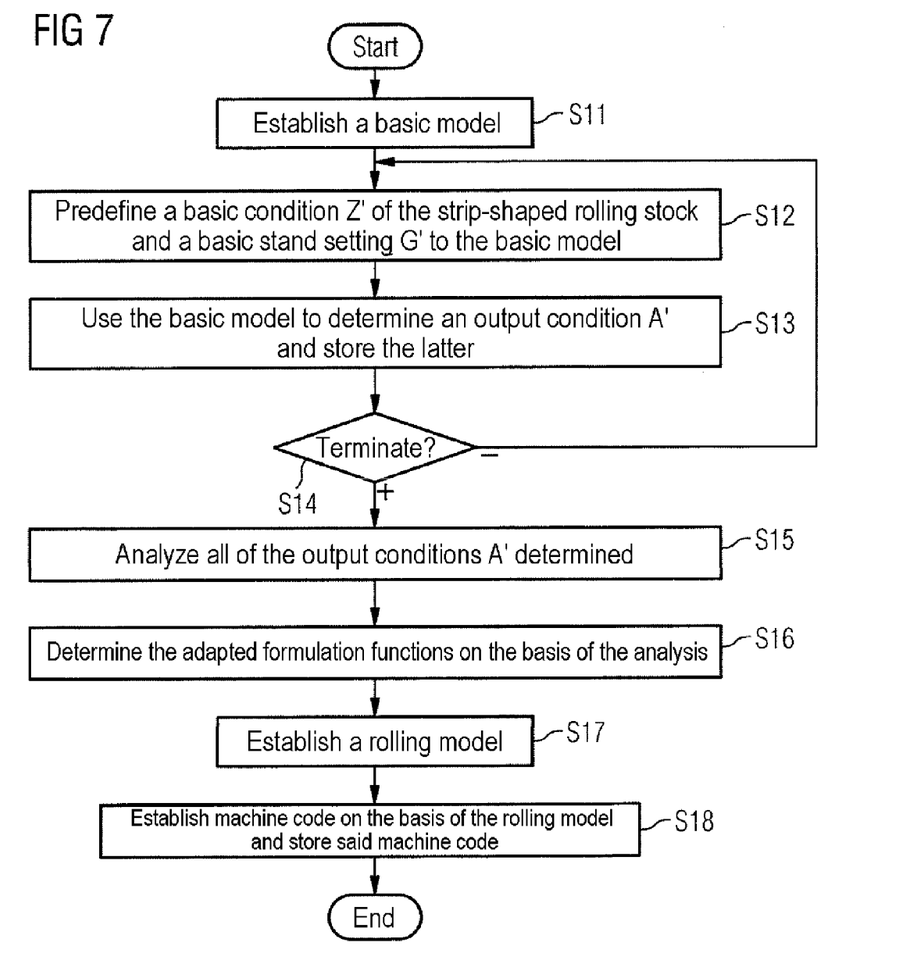
FIG. 7 shows a flowchart.
Figure 8:
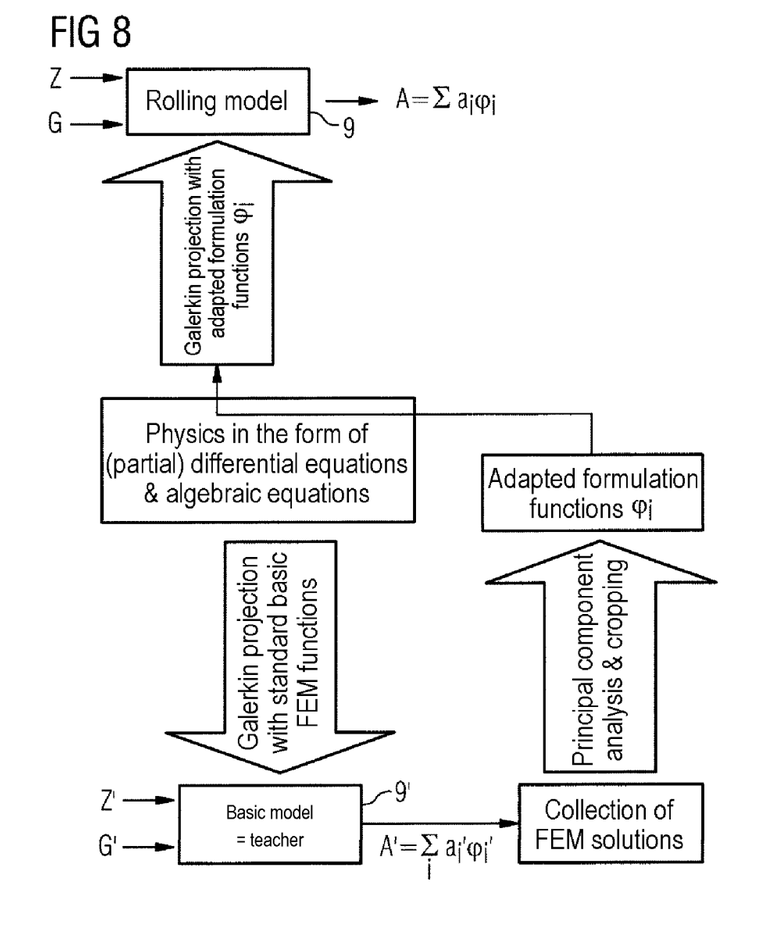
FIG. 8 shows a block diagram for additionally explaining

According to FIG. 7, a basic model 9' is first of all established in a step S11. According to FIG. 8, the basic model 9' is based on the same mathematical/physical equations as the rolling model 9. The difference from the rolling model 9 is that universal formulation functions φ', that is to say formulation functions φ' which are not specifically tailored to the description of particular rolling processes, are used to establish the basic model 9'. For example, the universal formulation functions φ' may be based on the finite element method. A large number of universal formulation functions φ' (typically several thousand, in some cases more than 10,000) are needed to establish the basic model 9'.

The basic model 9' need not necessarily be established during the establishing method according to various embodiments. It may be alternatively given in other ways. Suitable basic models 9' are even commercially available in some cases.

In a step S12, a basic condition Z' of the strip-shaped rolling stock 1 is predefined to the basic model 9'. Furthermore, a basic stand setting G' is predefined to the basic model 9' during step S12. The basic condition Z' lies within the predetermined range of conditions. The basic stand setting G' lies within the predetermined range of settings.

In a step S13, an output condition A' is respectively determined using the basic model 9'. The output condition A' is described by a number of weighting factors a' according to FIG. 8. The weighting factors a' each specify the extent to which a universal formulation function φ' associated with the respective weighting factor a' occurs in the strip-shaped rolling stock 1 following the rolling process (as defined by the basic condition Z' and the stand setting G'). The output condition A' determined is stored in step S13. The weighting factors a' may be determined in a similar manner to the weighting factors a. The difference is that the weighting factors a' are based on the universal formulation functions φ' and the weighting factors a are based on the adapted formulation functions φ.

In a step S14, is check is carried out in order to determine whether the determination of output conditions A' is intended to be terminated. If this is not the case, the method returns to step S12. Otherwise, the establishing method is continued with a step S15.

In step S15, all of the output conditions A' determined are analyzed. The adapted formulation functions φ are then determined in a step S16 on the basis of the analysis in step S15. The number of adapted formulation functions φ is considerably smaller than the number of universal formulation functions φ'. It is generally far less than 100, for example less than 70, in some cases even less than 50.

The rolling model 9 is established in a step S17. The rolling model 9 is established using the adapted formulation functions φ determined in step S16.

In a step S18, the rolling model 9 is used to establish the machine code 8 which can be executed directly by the computer 4 and the execution of which gives rise to the above-described method of operation of the computer 4. The machine code 8 which corresponds, in its entirety, to the computer program 5 is then stored, for example on the data storage medium 7.

Figure 9:
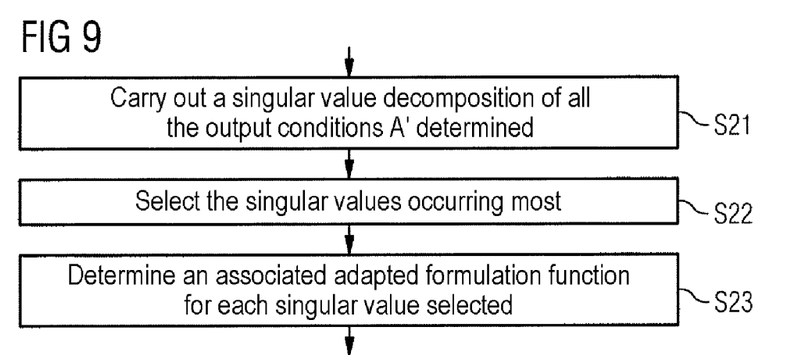

In order to implement steps S15 and S16 in FIG. 7, it is possible, for example, according to FIG. 9 to first of all carry out a singular value decomposition of all of the output conditions A' determined in a step S21 and to then select the singular values which occur most in a step S22. As a matter of form, it is mentioned that not only a single singular value but rather a plurality of singular values are naturally selected. However, the number of singular values selected is considerably smaller than the number of universal formulation functions φ' (typically at most 100 in comparison with several thousand). An associated adapted formulation function φ is then determined for each singular value in a step S23.

Alternatively, it is possible to carry out a principal component analysis on the basis of all of the output conditions A'. In this case, it is preferred to proceed as explained in more detail below in connection with FIG. 10.

Figure 10:
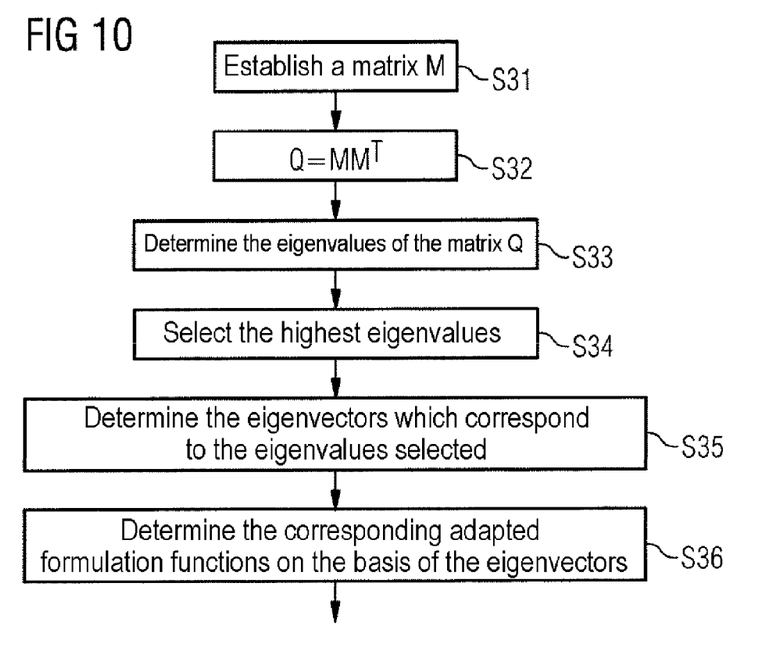

According to FIG. 10, a matrix M is first of all established in a step S31. For example, the weighting factors a' of each output condition A' determined may each form a column of the matrix M. In this case, it is possible to set the output conditions A' as the columns of the matrix M as they are. However, the matrix determined in this manner—referred to as the condition matrix below—does not yet constitute the matrix M. This is because the mean value of the respective row is preferably determined for each row in the condition matrix. The mean value is then subtracted from the matrix elements in the respective row. The matrix which has been determined in this manner and has been modified row by row forms the matrix M established in step S31.

In a step S32, the matrix M is multiplied by its transpose $M^T$. The matrix product determined in this manner produces a quadratic, symmetrical matrix Q.

In a step S33, the eigenvalues of the quadratic, symmetrical matrix Q are determined. In a step S34, the highest eigenvalues are selected. The limit to which the eigenvalues are selected may be predefined in different ways. For example, it is possible to predefine an absolute number of eigenvalues. Alternatively, it is possible to predefine a percentage of the eigenvalues. It is likewise possible to predefine an absolute value and to select all eigenvalues which are greater than or greater than/equal to this value. It is also possible to divide all eigenvalues by the highest eigenvalue and to select all eigenvalues in which the quotient with the largest eigenvalue is greater then or greater than/equal to a predetermined limit.

In a step S35, the eigenvectors which correspond to the eigenvalues selected in step S34 are determined. In a step S36, the corresponding adapted formulation functions φ are determined on the basis of the eigenvectors of the quadratic matrix Q. If, in accordance with the preferred procedure, the mean values are subtracted from the matrix elements during step S31, the mean values are added to the individual components of the eigenvectors in step S36.

The procedure explained above is known as such to experts. Therefore, there is no need for more detailed statements on said procedure.

Figure 11:
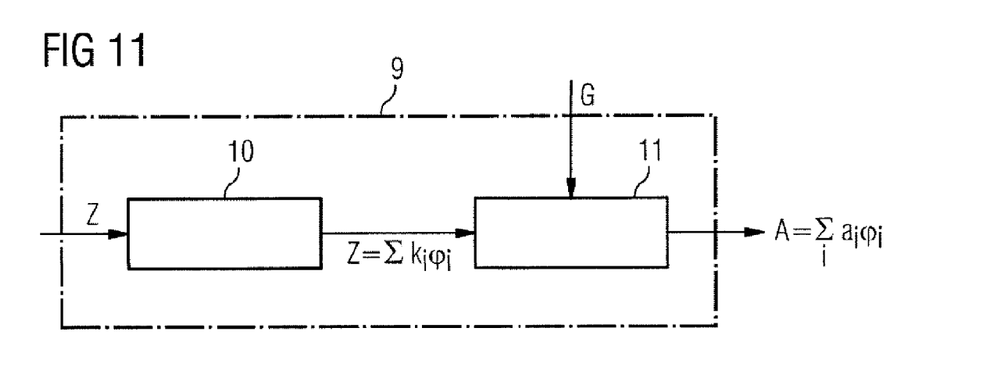
FIG. 11 shows a block diagram.

As already mentioned, the rolling model 9 operates with the adapted formulation functions φ. In this case, it is possible to already predefine the condition Z in an appropriately adapted form during the steps in FIG. 2 or in the illustration in FIG. 3. Alternatively, according to FIG. 11, it is possible for the rolling model 9 to have an advance block 10 and a main block 11. In this case, the condition Z is transformed into components k of the adapted formulation functions φ in the advance block 10. The output variable A is determined in the main block 11 on the basis of the components k of the adapted formulation functions φ and the stand settings G. It goes without saying that the rolling model 9 is accordingly established during the procedure in FIGS. 7 to 10 in this case.

The various embodiments have many advantages. In particular, the quality of the rolling model 9 is almost as high as that of the basic model 9' (which is typically based on the finite element method). In contrast, the computational complexity for determining the output variable A is drastically reduced since— in comparison with the basic model 9'—only a few formulation functions φ are used. The rolling model 9 has online capabilities, in particular, on account of this fact.

The description above is used solely to explain the present invention. However, the scope of protection of the present invention should be solely determined by the accompanying claims. In particular, the measures explained in the exemplary embodiments can also be used in rolling stock 1 which is not strip-shaped.

What is claimed is:

1. A method for establishing machine code which can be executed directly by a computer to implement a rolling model for a rolling process of a rolling stock by a rolling mill train having at least one rolling stand, the method comprising:
   establishing or accessing a basic model based on a plurality of known mathematical functions that are not specifically adapted to the particular rolling process,
   for each of a plurality of different rolling stock conditions within a range of rolling stock conditions and a plurality of different rolling stand settings within a range of rolling stand settings:
      predefining a respective rolling stock condition and a respective rolling stand setting for the basic model, and
      using the basic model to determine an output condition corresponding to the respective rolling stock condition and the respective basic rolling stand setting using the basic model, wherein the output condition is defined by a number of weighting factors which each specify the extent to which a respective corresponding mathematical function of the plurality of known mathematical functions occurs in the rolling stock following the rolling process defined by the respective rolling stock condition and the respective rolling stand setting,
   analyzing all of the output conditions corresponding to the plurality of different rolling stock conditions and plurality of different rolling stand settings,
   determining adapted mathematical functions based on the analysis of all of the output conditions,
   wherein the number of adapted mathematical functions is significantly smaller than the number of the plurality of known mathematical functions of the basic model,
   establishing the rolling model using the adapted mathematical functions, and
   establishing the machine code based on the rolling model.

2. The establishing method according to claim 1, wherein the analysis of all of the output conditions comprises a singular value decomposition.

3. The establishing method according to claim 1, wherein a quadratic, symmetrical matrix having a plurality of eigenvectors is determined based on all of the output conditions, and the adapted mathematical functions correspond to some of the eigenvectors of the quadratic, symmetrical matrix.

4. The establishing method according to claim 3, wherein eigenvalues of the quadratic, symmetrical matrix are determined, and the adapted mathematical functions correspond to the eigenvectors associated with the largest eigenvalues.

5. The establishing method according to claim 1, wherein the basic model is established during the establishing method.

6. The establishing method according to claim 1, wherein the rolling stock is strip-shaped rolling stock.

7. The establishing method according to claim 6, wherein the rolling model quantitatively describes a material flow occurring when calibration rolls of an edger are used.

8. A computer program product for establishing a rolling model for a rolling process of a rolling stock by a rolling mill train having at least one rolling stand, the computer program product stored in non-transitory computer-readable media and executable by a processor to:
   establishing or access a basic model based on a plurality of known mathematical functions that are not specifically adapted to the particular rolling process,
   for each of a plurality of different rolling stock conditions within a range of rolling stock conditions and a plurality of different rolling stand settings within a range of rolling stand settings:
      predefine a respective rolling stock condition and a respective rolling stand setting for the basic model, and
      use the basic model to determine an output condition corresponding to the respective rolling stock condition and the respective rolling stand setting using the basic model, wherein the output condition is defined by a number of weighting factors which each specify the extent to which a respective corresponding mathematical function of the plurality of known mathematical functions occurs in the rolling stock following the rolling process defined by the respective rolling stock condition and the respective rolling stand setting,
   analyze all of the output conditions corresponding to the plurality of different rolling stock conditions and plurality of different rolling stand settings,
   determine adapted mathematical functions based on the analysis of all of the output conditions, wherein the number of adapted mathematical functions is significantly smaller than the number of the plurality of known mathematical functions of the basic model, establish the rolling model using the adapted mathematical functions, and establish the machine code based on the rolling model.

9. The computer program product according to claim 8, wherein the analysis of all of the output conditions comprises, a singular value decomposition.

10. The computer program product according to claim 8, wherein a quadratic, symmetrical matrix having a plurality of eigenvectors is determined based on all of the output conditions, and the adapted mathematical functions correspond to some of the eigenvectors of the quadratic, symmetrical matrix.

11. The computer program product according to claim 10, wherein eigenvalues of the quadratic, symmetrical matrix are determined, and the adapted mathematical functions correspond to the eigenvectors associated with the largest eigenvalues.

12. The computer program product according to claim 8, wherein the rolling stock is strip-shaped rolling stock.

13. A rolling mill train comprising:
   at least one rolling stand, and
   a computer programmed to:
      establish or access a rolling model for a rolling process of a rolling stock by the at least one rolling stand, the computer program product stored in non-transitory computer-readable media and executable by a processor to:
      establishing or access a basic model based on a plurality of known mathematical functions that are not specifically adapted to the particular rolling process,
      for each of a plurality of different rolling stock conditions within a range of rolling stock conditions and a plurality of different rolling stand settings within a range of rolling stand settings:
         predefine a respective rolling stock condition and a respective rolling stand setting for the basic model, and
         use the basic model to determine an output condition corresponding to the respective rolling stock condition and the respective basic rolling stand setting using the basic model, wherein the output condition is defined by a number of weighting factors which each specify the extent to which a respective corresponding mathematical function of the plurality of known mathematical functions occurs in the rolling stock following the rolling process defined by the respective rolling stock condition and the respective rolling stand setting,
      analyze all of the output conditions corresponding to the plurality of different rolling stock conditions and plurality of different rolling stand settings,
      determine adapted mathematical functions based on the analysis of all of the output conditions, wherein the number of adapted mathematical functions is significantly smaller than the number of the plurality of known mathematical functions of the basic model,
      establish the rolling model using the adapted mathematical functions, and
      establish the machine code based on the rolling model.

* * * * *